United States Patent [19]

Hsiue et al.

[11] Patent Number: 5,241,036

[45] Date of Patent: Aug. 31, 1993

[54] SIDE-CHAIN LIQUID CRYSTALLINE POLYMER CONTAINING CROWN ETHER BASED MESOGENS

[75] Inventors: Ging-Ho Hsiue; Chain-Shu Hsu, both of Hsinchu; Jiunn-Shyang Wen, Changhua, all of Taiwan

[73] Assignee: National Science Council, Taipei, Taiwan

[21] Appl. No.: 754,598

[22] Filed: Sep. 4, 1991

[51] Int. Cl.$^5$ .............................................. C08G 77/38
[52] U.S. Cl. ...................................... 528/27; 528/15; 528/29; 525/479; 252/299.01; 252/299.61
[58] Field of Search .................... 525/479; 528/25, 29, 528/27; 252/299.61

[56] References Cited

U.S. PATENT DOCUMENTS 4,868,250  9/1989  De Martino ........................ 525/479

OTHER PUBLICATIONS

Makromol. Chem., Rapid Commun. vol. 11, pp. 151–157 (Apr. 1990).
Macromolecules, vol. 22, pp. 4408–4412 (Dec., 1989).
Blasius et al., *J. Chromatogr.*, 96, 89 (1974).
Kimura et al., *Journal of Liquid Chromatography,* 5(s.2), 223–255, 1982.
Cowie et al., *British Polymer Journal,* 20, 515–519, 1988.
He et al., *J. Chem. Soc., Chem. Commun.,* 1294–1296, 1987.
Kolthoff et al., *Analytical Chemistry,* 51, 8, 1301–1306, Jul. 1979.
Percec et al., *Macromolecules,* 22, 2043–2047, 1989.

*Primary Examiner*—Ralph H. Dean, Jr.
*Attorney, Agent, or Firm*—Bacon & Thomas

[57] ABSTRACT

A side-chain liquid crystalline polymer containing crown ether based mesogens having the following structure (polymer backbone)  (I)
└─(spacer) - (crown ether based mesogen)

wherein the polymer backbone is at least partially grafted by the crown ether based mesogens with oligo(methylene) or oligo(oxyethylene) spacers.

3 Claims, 7 Drawing Sheets

SIDE-CHAIN LIQUID CRYSTALLINE POLYMER CONTAINING CROWN ETHER BASED MESOGENS

FIELD OF THE INVENTION

The present invention relates to a side-chain liquid crystalline polymer containing crown ether based mesogens.

BACKGROUND OF THE INVENTION

Crown ethers are well-known for their ability to form strong complexes with alkali metal and organic cations. This unique cation binding ability has led to numerous applications in synthetical and analytical chemistry for crown ethers, for example the applications demonstrated in the following articles: "Potassium tert-Butoxide Complexed with a Macrocyclic Ligand for Determination of Autoprotolysis Constant of tert-Butanol and as a Titrant" by I. M. Kolthoff et al., *J. Anal. Chem.*, Vol. 51, No. 8, 1301 (1979); "Preparation and properties of ion exchangers based on macrocylic polyethers" by E. Blasins, *J. Chromatogr.* 96, 89 (1974); and "Use of Crown Ethers in Liquid Chromatography" by K. Kimura and J. Shono, *J. Liq. Chromatogr.*, 5 (Suppl. 2), 223–225 (1982).

Liquid Crystal is a mesophase between the crystalline (solid) and the amorphous (liquid) states. Crystal is an essentially homogenous substance in which molecules are arranged in a three-dimensional periodic pattern, i.e. a lattice, and the movement of these particles is confined in the lattice. On the other hand, liquid is an amorphous substance in which molecules have a significantly higher freedom of movement. Liquid Crystal is a mesophase between them, the molecules thereof are arranged in a one-or two-dimensional pattern and have an ability of movement similar to the liquid molecule. Therefore, a special electro-optical phenomenom may be observed when a liquid crystal is subject to an external driving force such as electric field.

Recently some authors have demonstrated the possibility of combining the complexing properties of crown ethers with the supramolecular arrangements provided by the mesophases of thermotropic liquid crystals. He et al. in their article entitled "Nematic Liquid Crystal Compounds containing a Benzocrown Ether Unit", *J. Chem. Soc. Chem. Commun.*, 1294 (1987), reported some nematic liquid crystal containing benzocrown ether units. Percec et al. in their article entitled "Liquid Crystal Polyethers Containing Macroheterocyclic Ligands. 1. Polyethers and Copolyethers Based on 4,4'-Dihydroxy-α-methylstilbene, Bis(8-bromooctyl)dibenzo-18-crown-6, and/or 1,11-Dibromoundecane", *Macromolecules*, 22, 2043 (1989), presented the synthesis and characterization of the thermotropic main-chain liquid crystalline polyethers and copolyethers containing dibenzocrown ether units. Cowie et al. in their article entitled "Thermotropic Liquid Crystalline Main-chain Polyamides Containing Diaza-18-crown-6-ether Units", *Brt. Polym. J.*, 20, 515 (1988), demonstrated the synthesis of thermotropic liquid crystalline main-chain polyamide containing diaza-18-crown-6-ether units.

The object of present invention is to provide a series of new side-chain liquid crystalline polymers containing crown ether based mesogens. As far as the best knowledge we know, this is the first example of a side-chain liquid crystalline polymers containing crown ether based mesogens.

SUMMARY OF THE INVENTION

A side-chain liquid crystalline polymers containing crown ether based mesogens having the following structure

wherein:
- the polymer is selected from the polymers having a low glass transition temperature (Tg) and a high heat stability such as polysiloxanes and poly(meth)acrylates, which is at least partially grafted by the spacer;
- the spacer is —(CH2)$_m$—, wherein m is an integer of 1–12, or —(OCH2CH2)$_i$—, wherein i is an integer of 1–4; and
- the crown ether based mesogen is

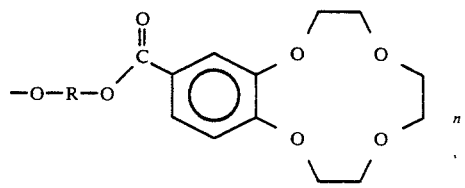

where R is

n is an integan of 0–3, or

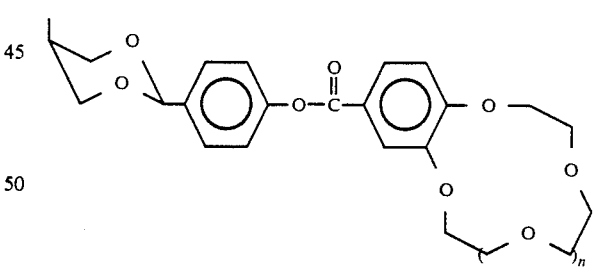

wherein n is the same as defined above.

The side-chain liquid crystalline polymers containing crown ether based mesogens synthesized in the present invention have a high ion-selective property and are suitable to be used for the application of ion-selective electrode. It is believed that the high ion-selectivity is an inherent property of the crown ether structure thereof, but the regularity existing in the liquid crystalline phase enhances the ion-selectivity of the side-chain liquid crystalline polymers.

second heating scan; D) Copolysiloxane 9, second heating scan; E) cooling scan; F) Copolysiloxane 15, second heating scan; G) cooling scan.

Figure 2A:
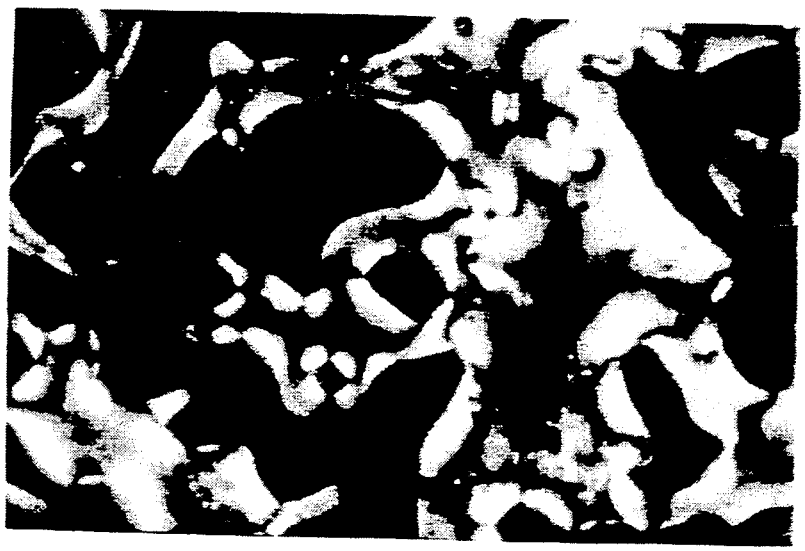

FIG. 2A: Typical optical polarizing micrograph (800×) of copolysiloxane 8: texture obtained at 50° C. on cooling scan.

Figure 2B:
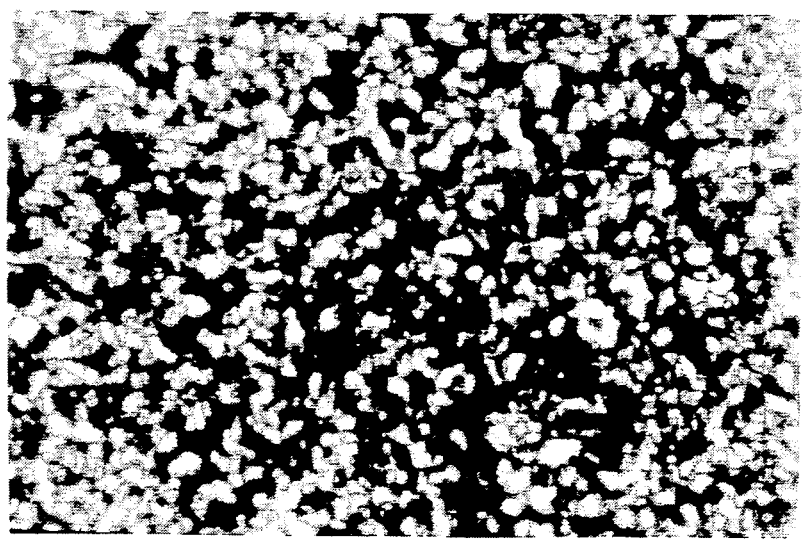

FIG. 2B: Typical optical polarizing micrograph (400×) of copolysiloxane 9: nematic schlieren texture obtained at 90° C. on cooling scan.

Figure 3:
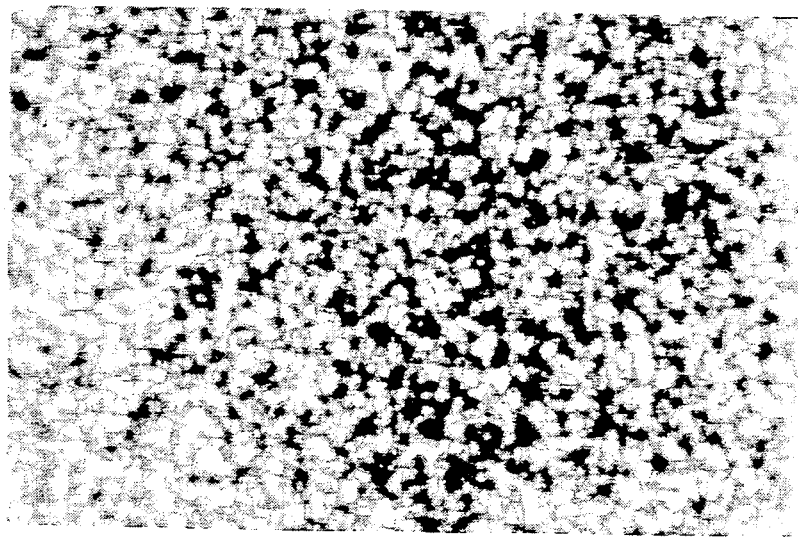

FIG. 3: Typical optical polarizing micrograph (400×) of copolysiloxane 15; nematic schlieren texture obtained at 173° C. on cooling scan.

Figure 4:
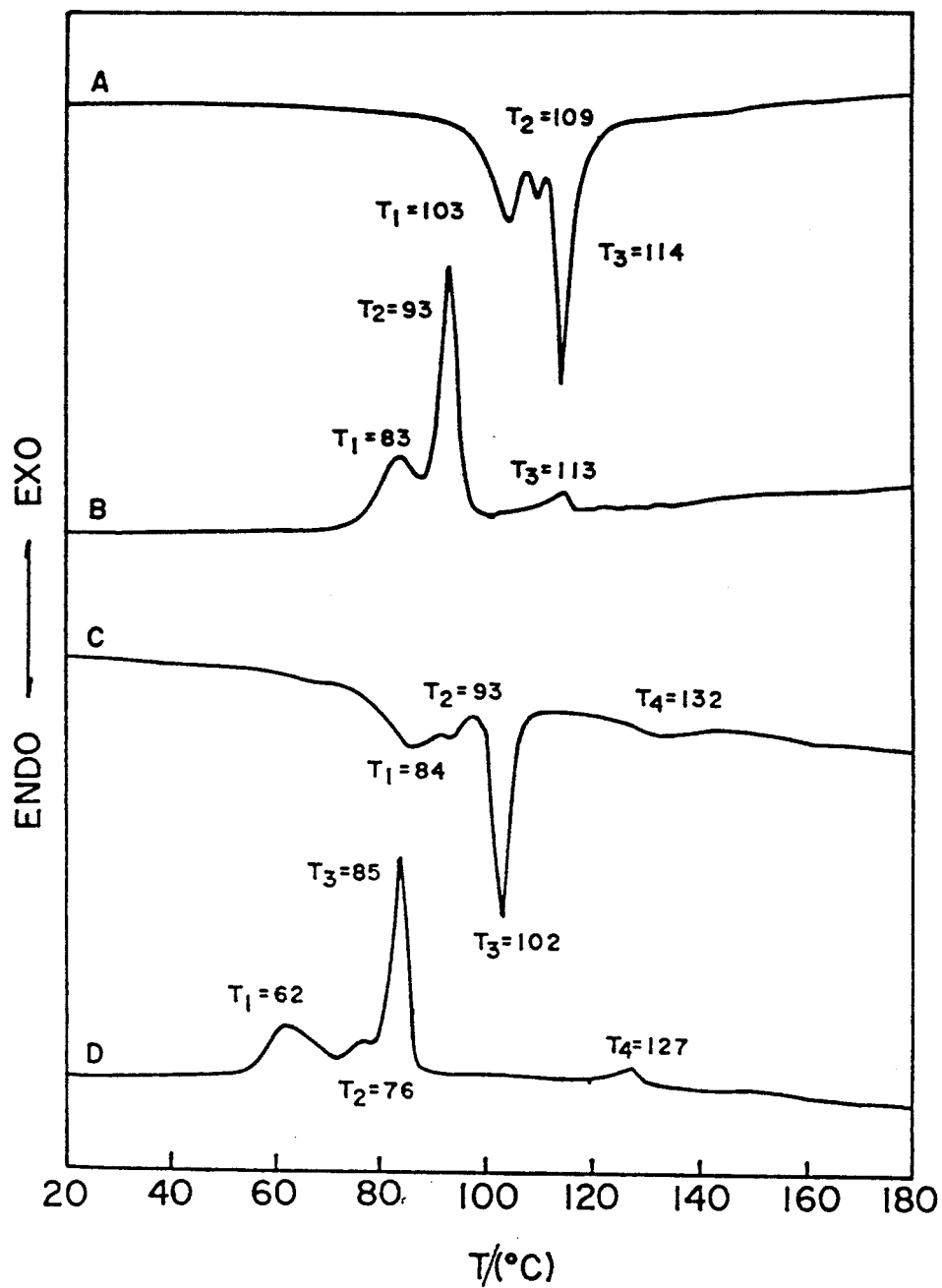

FIG. 4: DSC thermograms (20° C./min) of: A) Copolysiloxane 25, second heating scan; B) cooling scan; C) Copolysiloxane 26, second heating scan; D) cooling scan.

Figure 5:
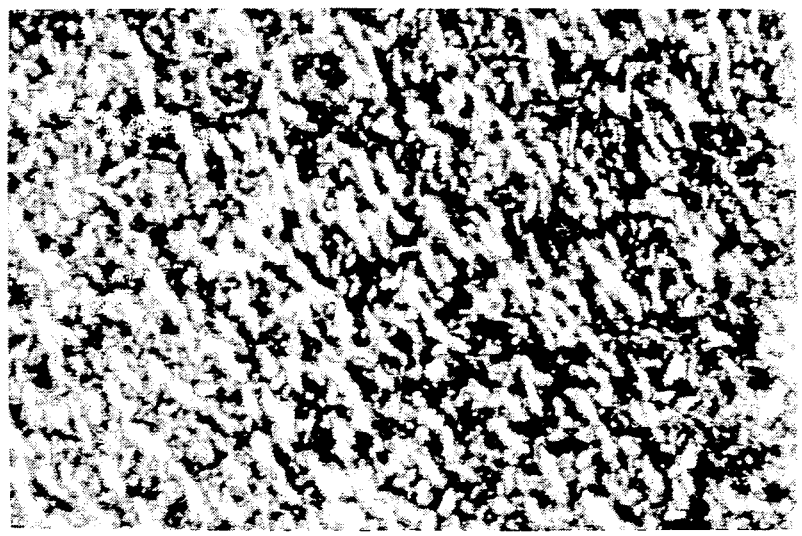

FIG. 5: Typical nematic schlieren texture exhibited by copolysiloxane 26.

Figure 6:
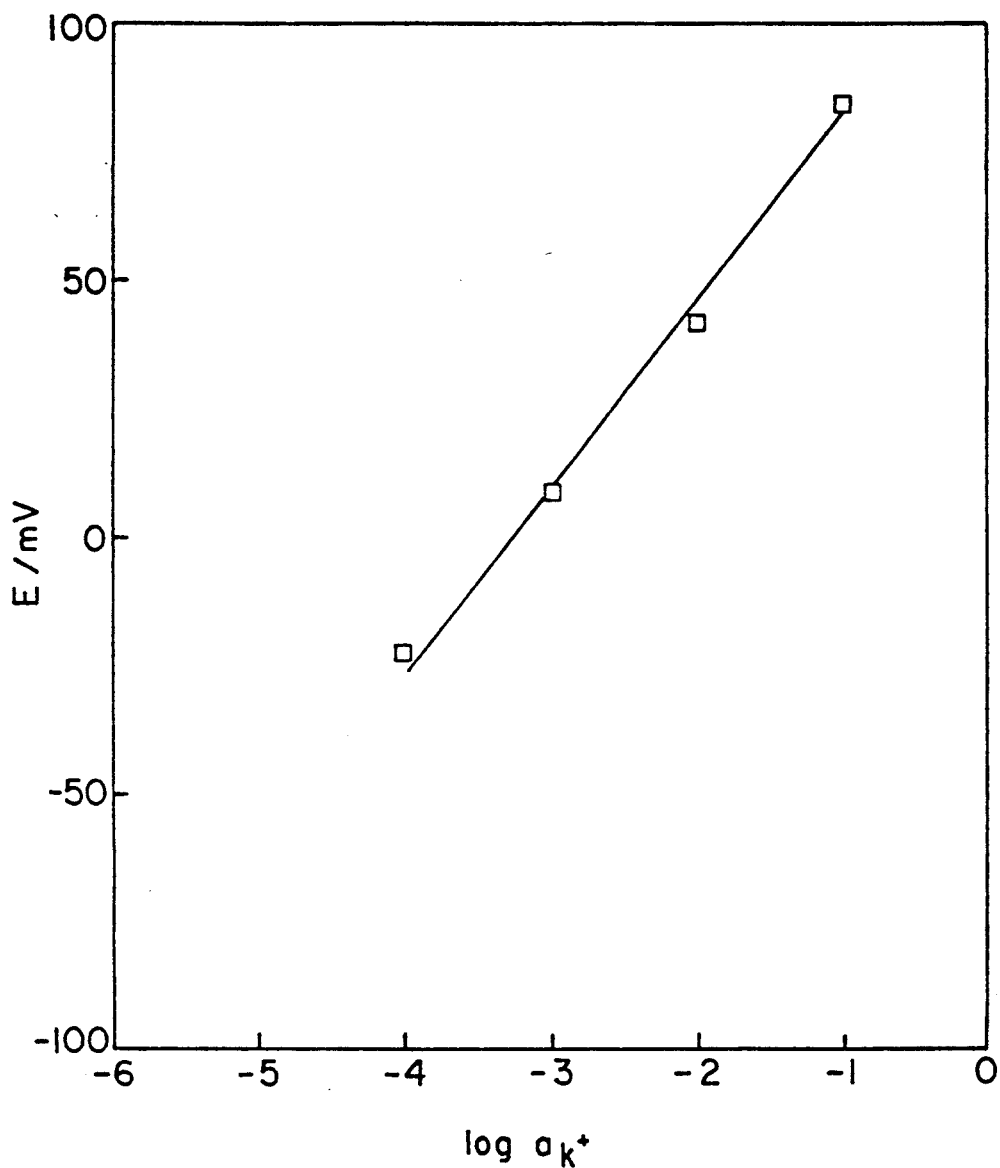

FIG. 6: Measurement of potassium ion concentration by using electrode based on crown ether containing liquid crystalline polymer membrane.

Figure 7:
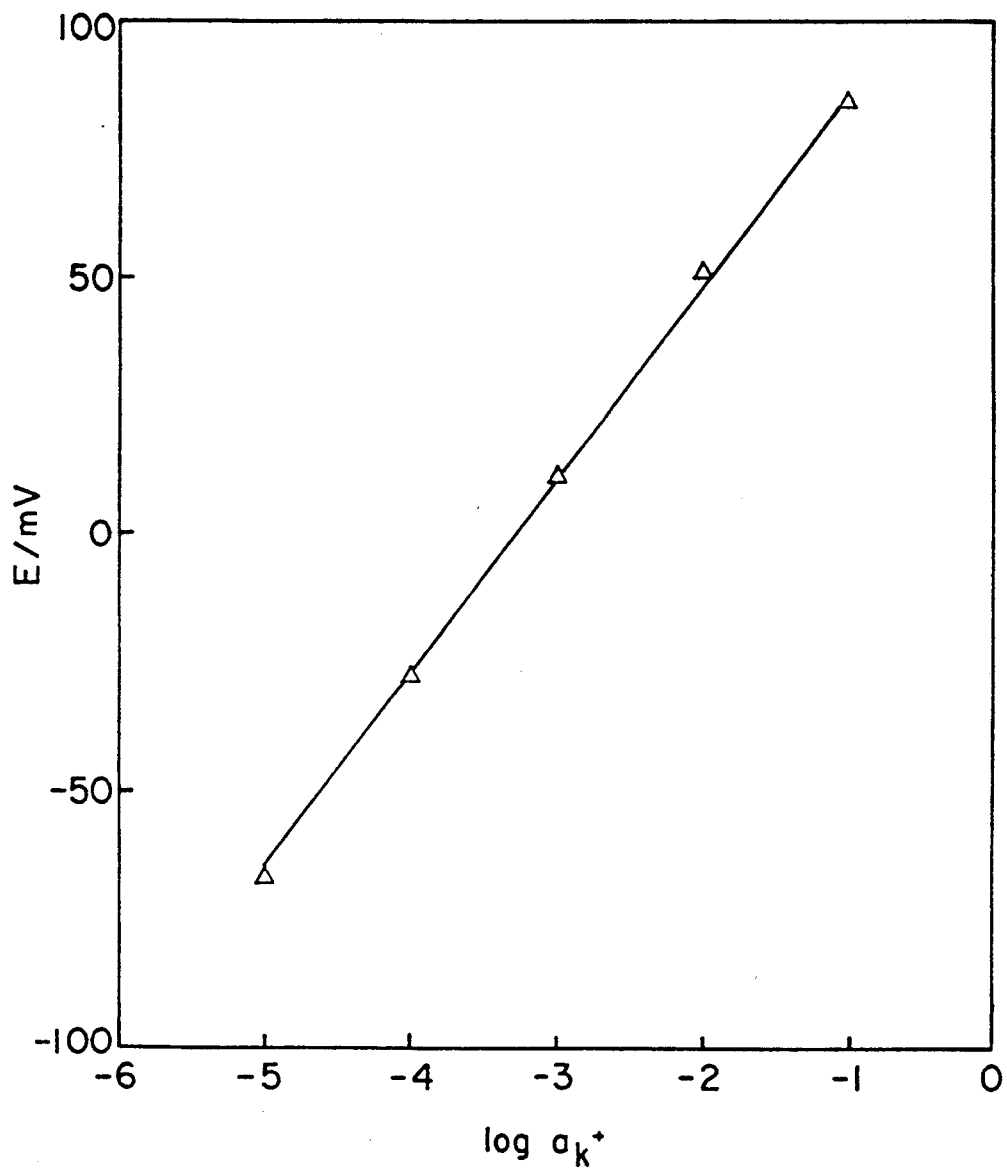

FIG. 7: Measurement of potassium ion concentration in the presence of 0.1M Na+ by using electrode based on crown ether containing liquid crystalline polymer membrane.

DETAILED DESCRIPTION OF THE INVENTION

The side-chain liquid crystalline polymers containing crown ether based mesogens of the above formula (I) have a structure which comprises a polymer backbone, and crown ether containing mesogenic groups which are grafted to the backbone with oligo(methylene) or oligo(oxyethylene) spacers. The side-chain liquid crystalline polymers of formula (I) will exhibit both the polymer characteristics form the polymer backbone, the liquid crystalline and the crown ether properties from the crown ether containing mesogenic groups. The spacers connecting the mesogenic groups with the polymer backbone have a function of decoupling the motion of the polymer chain, and thus increase the mobility of the mesogen containing side chains.

A process for preparing the side-chain liquid crystalline polymers containing crown ether based mesogens of the formula (I) comprises introducing a carboxylic or an aldehyde group into a crown ether compound, forming an olefinic monomer containing crown ether based mesogen by reacting the carboxylic or aldehyde function group with a compound having an ethylenically unsaturate group at one end and a or two hydroxy groups at another end, and grafting this monomer onto a polymer in the presence of an organic metal salt catalyst.

The polymers suitable for using as the polymer backbone of formula (I) are those having a low glass transition temperature (Tg) and a high heat stability such that the side-chain liquid polymers synthesized can be formed into a membrane by cast molding or other conventional molding technique. Examples of these polymers include siloxane homopolymers and copolymer, acrylate homopolymers and copolymers, and the like. Among them, siloxane homopolymers and copolymers having a $\overline{Mn}=400$–15,000 are preferable.

In several preferred embodiments of the present invention benzo-15-crown-5 based mesogenic groups were used to graft to copolysiloxanes with flexible spacers to synthesize side-chain liquid crystalline copolysiloxanes containing benzo-15-crown-5 based mesogenic side groups. The routes of synthesis are shown in Schemes 1–3.

Scheme 1:

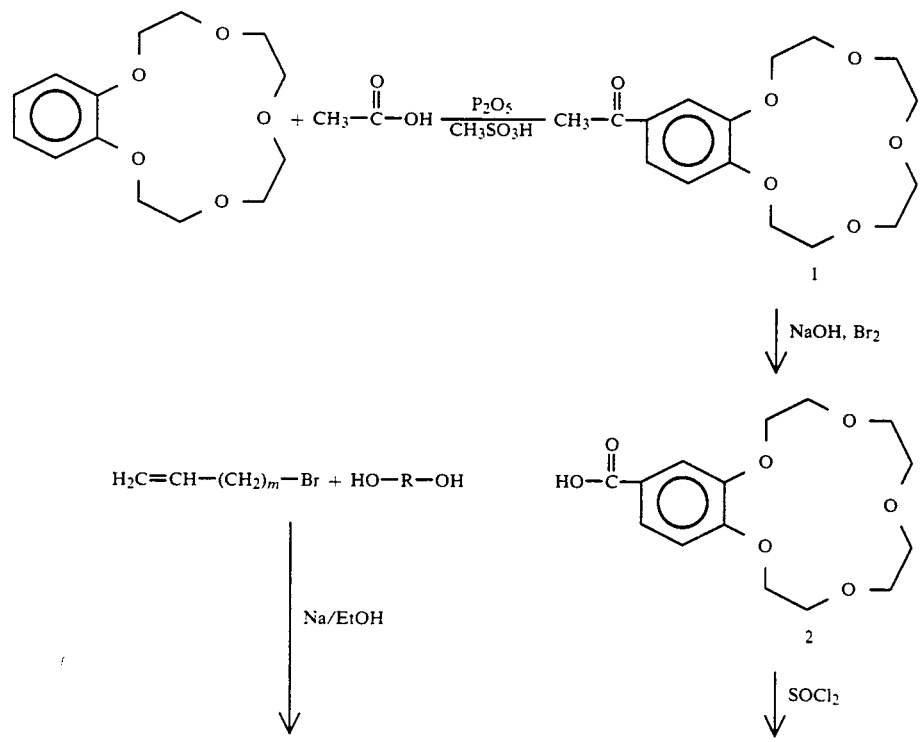

Scheme 1:
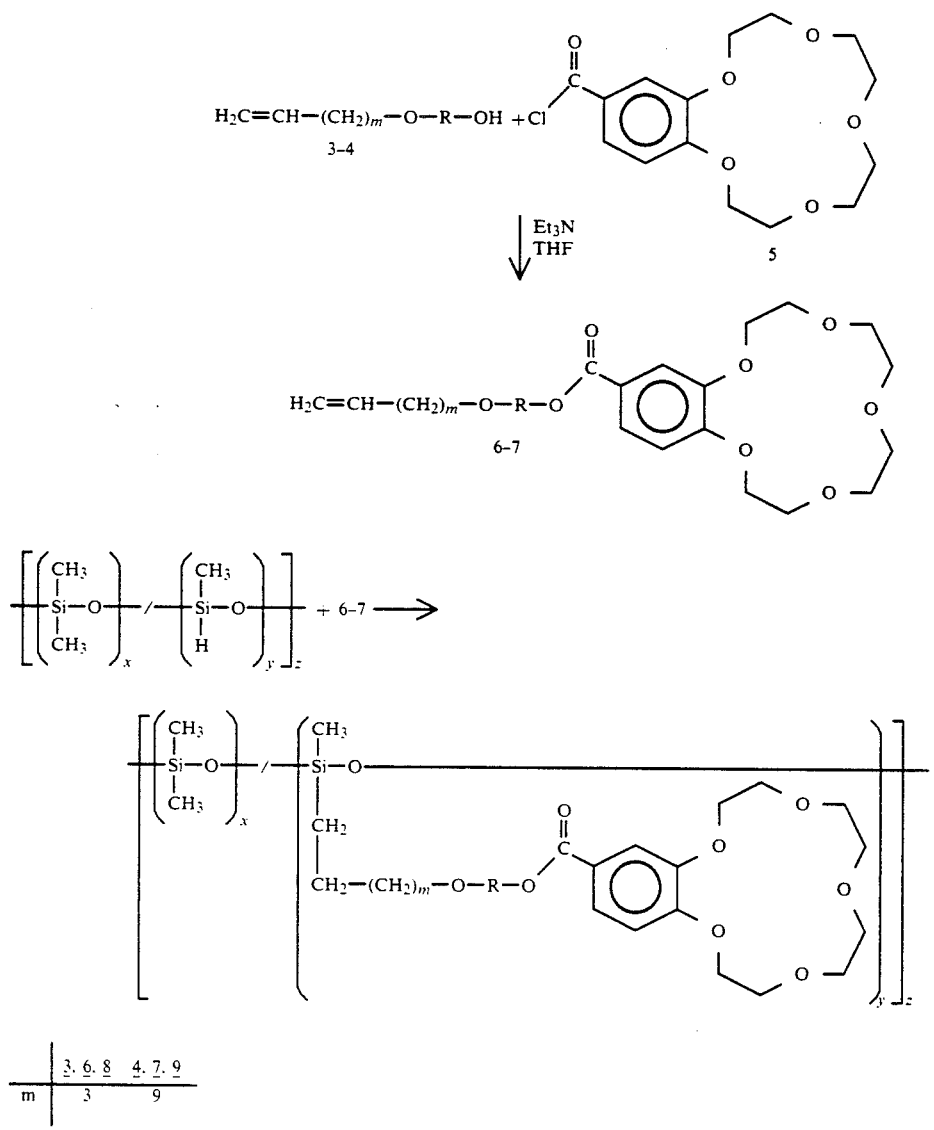
| m | 3, 6, 8 | 4, 7, 9 |
|---|---------|---------|
|   | 3       | 9       |
Scheme 2:
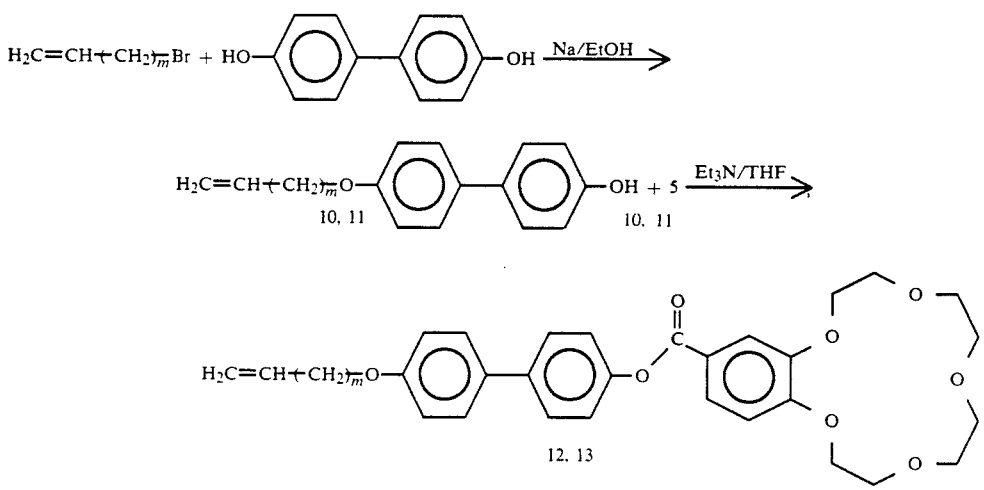

Scheme 2:

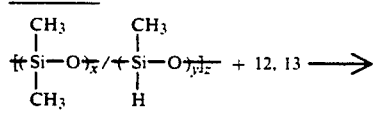

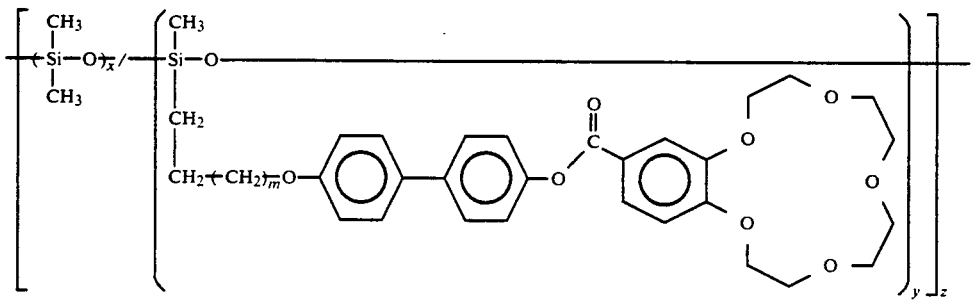

| m | 10 | 11 | 12 | 13 | 14 | 15 |
|---|----|----|----|----|----|----|
|   | 3  | 9  | 3  | 9  | 3  | 9  |

In Scheme 1 or 2, 4'-acetobenzo-15-crown-5 is obtain in high yield by directly reacting benzo-15-crown-5 with acetic acid and Eaton's reagent (phosphorous pentoxide in methane-sulfonic acid). The acetyl group of 4'-acetobenzo-15-crown-5 is easily oxidized by sodium hypobromide to form 4'-carboxybenzo-15-crown-5, and then the carboxylic group is converted to acid chloride. In the other hand, hydroquinone with one of its terminal hydroxy group is etherified with vinyl oligo(methylene) bromide and the resulting product is reacted with the acid chloride to form the olefinic monomers. The olefinic monomers are grafted to poly (hydrogen-methyl-co-dimethylsiloxane) through hydrosilation reaction in the presence of Pt (II) metal catalyst in tolune. The hydrosilation reaction is difficult to perform to completion due to the crown ether containing monomers are very bulky, therefore the reaction is carried out for a long period of time until both IR and $^1$H-NMR analyses show most of the Si-H bonds are reacted.

Scheme 3 presents the synthetic procedures used to prepare the 1,3-dioxane based monomers. A mixture of cis and trans isomers is usually obtained. After several recrystallization steps, the trans-isomer was isolated with 100% purity as determined by $^1$H-NMR spectroscopy and thin layer chromatography.

Scheme 3:

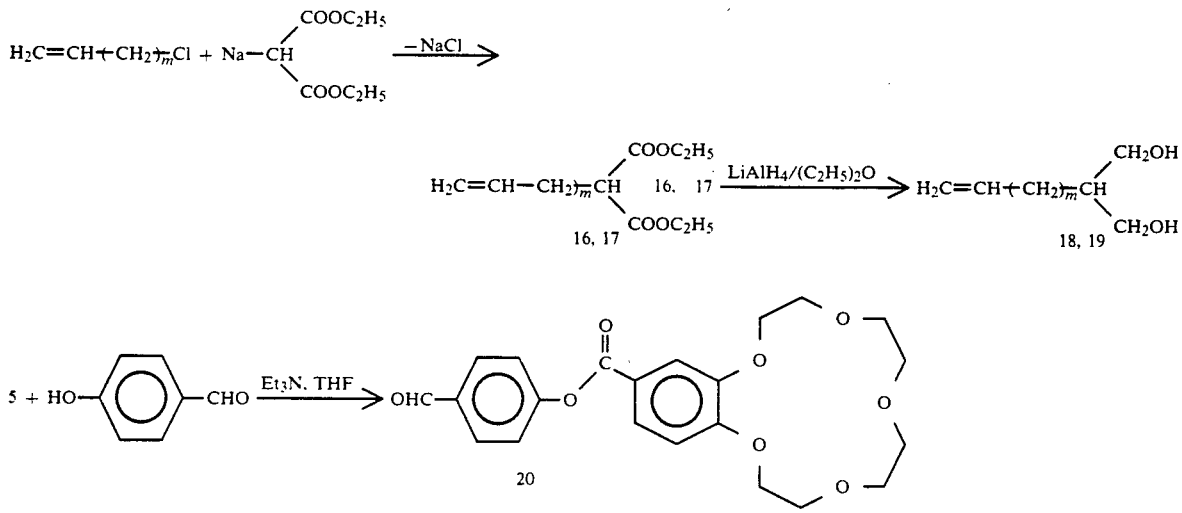

Scheme 3:

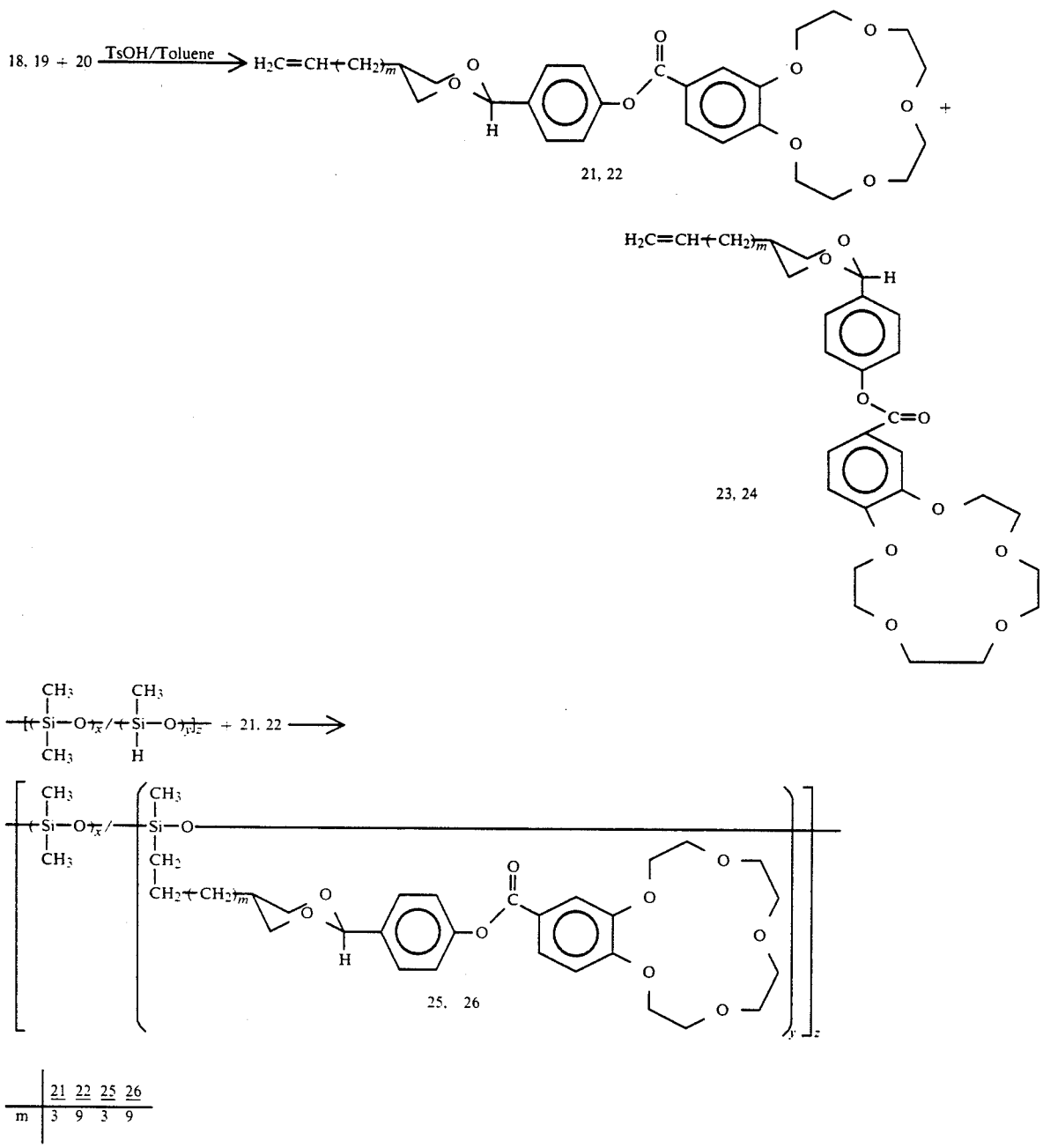

| | 21 | 22 | 25 | 26 |
|---|---|---|---|---|
| m | 3 | 9 | 3 | 9 |

The following examples are only used to illustrate the present invention and not meant to be limiting.

Materials

Poly [(30–35%) hydrogenmethyl-co-(65–70%) dimethyl-siloxane]($\overline{M}n$=2000–2100) (from Petrarch System Inc.) were used as received. Benzo-15-crown-5 and the other reagents (from Aldrich) were used as received. Toluene, used in hydrosilation reaction, was first refluxed over sodium and then distilled under argon.

Techniques

Experimental techniques used in the characterization of intermediary compounds and of polymers are idential to those previously disclosed in U.S. Pat. No. 5,091,274.

EXAMPLE 1

Two different side-chain liquid crystalline copolysiloxanes containing benzo-15-crown-5 based mesogens were synthesized according to Scheme 1 in this example. The properties of intermediary compounds and of polymers were also investigated.

2-Acetyloctahydrobenzo[b]-1,4,7,10,13-pentaoxacyclopentadecene (4'-Acetylbenzo-[15]crown-5) (1): Glacial acetic acid (1.3 g) was added to a stirred solution of $P_2O_5$ (2 g) in methanesulfonic acid (17 ml) at 50° C. Benzo-[15]crown-5 (5.0 g) was then added to the reaction mixture. After 5 h the reaction was quenched by pouring the mixture onto 100 ml of ice/water. The resulting solution was extracted three times with methylene chloride (3×50 ml). The collected organic phase was washed with 2% aqueous sodium hydrogen carbonate solution, dried over anhydrous $Na_2SO_4$, and the solvent evaporated on a rotavapor. The obtained white solid was recrystallized from hexane; m.p. 97° C. Yield 4.0 g (69%).

$^1$H NMR ($CDCl_3$): $\delta=2.54$ (s; 3H, $CH_3$—), 3.74–4.14 (m; 16H, —($OCH_2CH_2$)$_4$—), 6.84–7.58 (m; 3 aromatic protons).

2-(Octahydrobenzo[b]-1,4,7,10,13-pentaoxacyclopentadecene) carboxylic acid (4'-carboxybenzo-[15]crown-5) (2): To a stirred solution of sodium hydroxide (22 g; 0.55 mol) in 150 ml of water at 0°–10° C. was added dropwise bromine (7 ml; 0.138 mol). Then, 4'-acetylbenzo-[15]crown-5 (1) (10.5 g; 0.033 mol) was added portionswise during 15 min with vigorous stirring. The reaction temperature, which initially increased to 40° C., was maintained at 20° C. with an ice-bath. After 5 h, sodium hydrogen sulfite (4.16 g; 0.04 mol) was added to destroy excess sodium hypobromide. The reaction mixture was filtered, then extracted with chloroform to remove any unreacted ketone. The aqueous layer was acidified with concentrated HCl to precipitate the acid and cooled to 0°–5° C. The solution was filtered and the white precipitate was washed with water and recrystalized from ethanol; m.p. 180° C. Yield: 9.3 g(90%).

$^1$H NMR (DMSO): $\delta=3.69-4.18$ (m; 16H, —($OCH_2CH_2$)$_4$—, 6.80–7.56 (m; 3 aromatic protons).

4-(4-pentenyloxy)phenol (3) and 4-(10-undecenyloxy)phenol (4): Both two compounds were synthesized by the same method. The preparation of 3 is presented as an example.

To a sodium ethoxide solution, prepared by dissolving cleanly-cut sodium (3.45 g; 0.15 mol) in 100 ml of absolute ethanol, hydroquinone (16.5 g; 0.15 mol) was added. The ethanol was then completely evaporated in a rotavapor and the sodium salt of hydroquinone was isolated. The dried sodium salt was immediately dissolved in 100 ml of 1-methyl-2-pyrrolidone, and 11-chloro-1-undecene (28.75 g; 0.152 mol) was added. The resulting solution was stirred at 110° C. under a nitrogen atmosphere for 24 h, cooled, filtered to remove the obtained sodium chloride, and the solvent was removed in a rotavapor. The residual solid was washed with water, dried and purified by column chromatography (silica gel, a mixture of ethyl acetate/hexane, vol. ratio 1:3, as eluent) to give a white solid product; m.p. 64° C. Yield of 3:12.1 g (30%).

$^1$H NMR ($CDCl_3$): $\delta=1.31-2.07$ (m; 16H, —($CH_2$)$_8$—), 3.86 (t; 2H, —$CH_2O$—Ph), 4.95 and 5.78 (m; 3H, $CH_2$=CH—), 6.71–6.77 (m; 4 aromatic protons).

Synthesis of monomers 6–7: Both two compounds were synthesized by the same method. The preparation of 7 is presented as an example.

To a solution of 4'-carboxy benzo-[15]crown-5 (1.0 g; 3.2 mmol) in 50 ml of methylene chloride was added dropwise thionyl chloride (0.57 g; 4.8 mmol). The resulting mixture was refluxed for 3 hours followed by removal of solvent and excess thionyl chloride under vacuum. The obtained acid chloride (5) was immediately dissolved in 50 ml of tetrahydrofuran. The solution was then added dropwise into a mixture of compound 4 (0.84 g; 3.2 mmol) and triethylamine (0.4 g; 4.0 mmol in 20 ml of tetrahydrofuran at 0°–5° C. The reaction mixture was stirred at room temperature overnight and filtered. The filtrate was evaporated in a rotavapor and the obtained solid was recrystallized from methanol, to give a white solid product. Yield of 7:0.91 g (51%).

$^1$H NMR ($CDCl_3$): $\delta=1.31-2.08$ (m; 16H, —($CH_2$)$_8$—), 3.70–4.25 (m; 18H, —($OCH_2CH_2$)$_4$— and —$CH_2O$—Ph), 5.20 and 5.92 (m; 3H, $CH_2$=CH—), 6.78–7.78 (m; 7 aromatic protons).

| | | | |
|---|---|---|---|
| 6: $C_{26}H_{32}O_8$ (472.5) | Calc. | C 66.09 | H 6.83 |
| | Found | C 66.02 | H 6.79 |
| 7: $C_{32}H_{44}O_8$ (556.7) | Calc. | C 69.04 | H 7.97 |
| | Found | C 69.06 | H 7.92 |

Monomer 6–7 were obtained with high purity as determined by $^1$H-NMR spectroscopy and thin layer chromatography and characterized by differential scanning calorimetry and optical polarizing microscopy. Their thermal behavior is summarized in Table 1.

Synthesis of copolymers 8–9

Copolymers were prepared by hydrosilation of the corresponding olefinic derivatives with poly[(30–35%) hydrogen-methyl-co-(65–70%) dimethylsiloxane] using dicyclopentadienyl-platinum (II) chloride as catalyst in toluene. A detailed procedure is given as follows. The olefinic derivative (0.5 g, 10 mol % excess versus the Si-H groups) was dissolved in 50 ml of freshly distilled toluene together with the proper amount of poly [(30–35%) hydrogenmethyl-co-(65–70%) dimethylsiloxane]. The reaction mixture was heated to 110° C. under nitrogen, and 50 μl of dicyclopentadienyl-platinum (II) chloride catalyst were then injected with a syringe as solution in methylene chloride (1 mg/ml). The reaction mixture was refluxed under nitrogen until both IR and $^1$H-NMR analyses showed that the hydrosilylation reaction was complete. The solution was filtered and the polymers were separated by precipitation in methanol, purified by several reprecipitation from tetrahydrofuran solution into methanol, and dried under vacuum.

Figure 1:
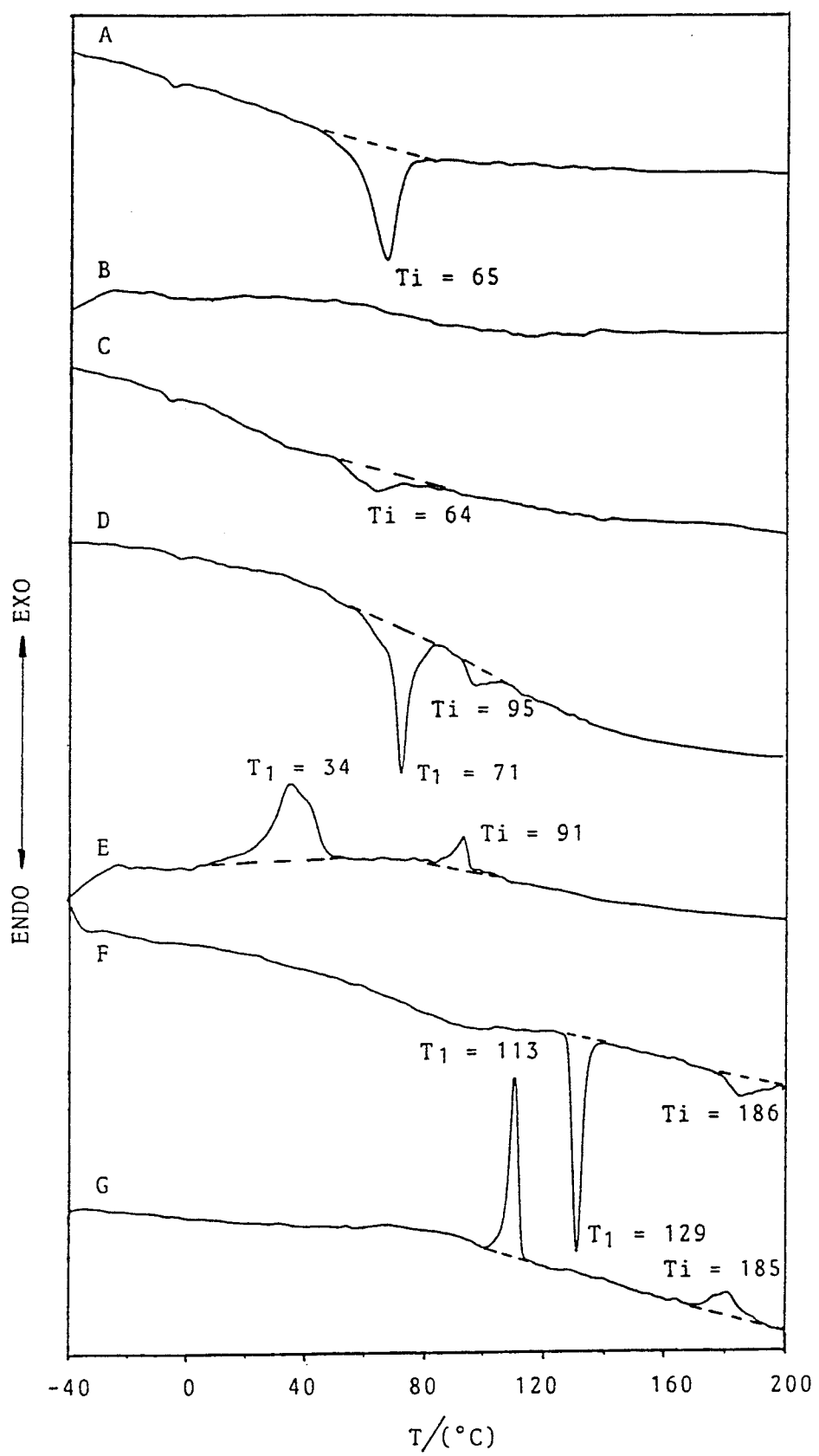
FIG. 1: DSC thermograms (20° C./min) of: A) Copolysiloxane 8, first heating scan; B) cooling scan; C)

The thermal transitions and thermodynamic parameters of the synthesized copolymers are also summarized in Table 1. All the copolysiloxanes show a low glass transition temperature at about −110° C. and enantiotropic mesophase behavior. FIG. 1 illustrates some representative DSC traces for the obtained copolysiloxanes. Polymer 8 and 9 which contain the same mesogenic group and dissimilar spacers, demonstrate very different phase behavior on DSC scans. Polymer 9 shows respectively two thermal transitions on both heating and cooling scans. However, polymer 8 presents only one transition on first heating scan (curve A) and on subsequent cooling scan (curve B) and second heating scan (curve C), the transition peak becomes very small. This could be due to the bulky mesogenic group and short spacer length of polymer 8. As the spacer length has not sufficient long, it is very difficult for the mesogenic groups of polymer 8 to reform mesophase from isotropic phase during the cooling process. This phenomenon was also proved by texture observation of polymer 8 under optical polarizing microscope. As can be seen from FIG. 2(A), no uniform texture was observed and only some birefringence was occured. It indicates the formation of mesophase, but it is difficult at this time to make any assumptions concerning the type of mesophase exhibited by this polymer. For polymer 9, the first endotherm (71° C.) on the second heating scan (curve D) represents a melting into a nematic mesophase that undergoes isotropization at 95° C. On the cooling scan (curve E) crystallization is more supercooled than the isotropization temperature. At the same time the enthalpy change of crystallization is much larger than that of isotropization. FIG. 2(B) presents a typical nematic schlieren texture exhibited by copolymer 9.

TABLE 1

Phase transitions for monomers 6–7, and phase transition enthalpies for polymers 8–9

| Monomer | Phase transitions, T/°C. heating cooling | Polymer | Phase transitions, T/°C.[a] heating cooling |
|---|---|---|---|
| 6 | k-103-i | 8 | g-111-lc-64(0.46)-i |
|   | —       |   | —                   |
| 7 | k-97-i  | 9 | g-111-k-71(2.02)-n-95(0.23)-i |
|   | —       |   | i-91(0.32)-n-34(1.99)-k |

[a]In parentheses: corresponding enthalpie changes in kcal per mol of repeating units. k = crystalline, n = nematic, i = isotropic, g = glassy, lc = liquid crystalline.

EXAMPLE 2

Similar to the procedures of Example 1, two side-chain liquid crystalline copolysiloxanes were synthesized according to Scheme 2 in this example. The elemental analysis of synthesized monomers 12, 13 are listed as follows:

| 12: $C_{32}H_{36}O_8$ (548.6) | Calc. | C 76.80 | H 7.73 |
|---|---|---|---|
|   | Found | C 76.78 | H 7.73 |
| 13: $C_{32}H_{48}O_8$ (632.8) | Calc. | C 72.13 | H 7.64 |
|   | Found | C 71.99 | H 7.58 |

The $^1$H-NMR shifts of the obtained monomers 12, 13 are listed in Table 2.

The thermal transitions and thermodynamic parameters of the synthesized monomers 12, 13 and copolymers 14, 15 are summarized in the following Table 3 and 4, respectively. As can be seen from Table 3, monomers 12 and 13 present respectively an enantiotropic, nematic mesophase. The data of Table 4 also show that both copolymers 14 and 15 exhibit respectively a crystalline phase and an enantiotropic nematic mesophase. The isotropization temperature of polymer 15 is higher than than of copolymer 14. The result demonstrates that the thermal stability of the mosophase increase with the increasing in the spacer length.

The DSC thermograms of copolymer 15 is also illustrated in FIG. 1. Copolymer 15 shows similar phase behavior as copolymer 9, except that all transitions shift to high temperature. It is quite reasonable, because the only difference between two copolymers is that one of the phenyl ring on the mesogenic groups of copolymer 9 is replaced by a biphenylylene group in the structure of copolymer 15.

FIG. 3 presents a typical nematic schileren texture exhibited by copolymer 15.

TABLE 2

Characterization of compounds 12, 13, and 21, 22

| compound | 100 MHz $^1$H-NMR (CDCL$_3$, δ) |
|---|---|
| 12 | δ = 1.57–2.31(m, 6H—(C$\underline{H}_2$)$_3$—), 3.70–4.28(m, 16H, —(O—C$\underline{H}_2$—C$\underline{H}_2$)$_4$— and), 4.89 and 5.84(m, 3H, C$\underline{H}_2$=C$\underline{H}$—), 6.85–7.83(m, 7H, ArH) |
| 13 | δ = 1.21–2.05(m, 18H, —(C$\underline{H}_2$)$_9$—), 3.70–4.25(m, 16H, —(O—C$\underline{H}_2$—C$\underline{H}_2$)$_4$— and), 4.96 and 5.78(m, 3H, C$\underline{H}_2$=C$\underline{H}$—), 6.87–7.87(m, 7H, ArH) |
| 21 | δ = 1.16–2.04(m, 7H—(C$\underline{H}_2$)$_3$—C$\underline{H}$<), 3.54 and 4.17 (m, 20H, two —O—C$\underline{H}_2$— and —(O—C$\underline{H}_2$—$_c$H$_2$)$_4$—), 4.94(m, 2H, C$\underline{H}_2$=CH—), 5.43(s, 1H, Ph—C$\underline{H}$<), 5.80(m, 1H, CH$_2$=C$\underline{H}$—), 6.85–7.85(m, 7H, ArH) |
| 22 | δ = 1.16–2.04(m, 19H—(C$\underline{H}_2$)$_9$—C$\underline{H}$<), 3.54 and 4.23 (m, 20H, two —O—C$\underline{H}_2$— and —(O—C$\underline{H}_2$—C$\underline{H}_2$)$_4$—), 4.94(m, 2H, C$\underline{H}_2$=CH—), 5.41(s, 1H, Ph—C$\underline{H}$<), 5.80(m, 1H, CH$_2$=C$\underline{H}$—), 6.96–7.92(m, 7H, ArH) |

Table 3

Phase transitions and phase transition enthalpies for monomers

| Monomer | Phase transitions, T °C. (Corresponding enthalpies changes, Kcal/mol)[a] | |
|---|---|---|
|   | heating | cooling |
| 12 | k 121 (8.06) n 142(0.52) i | i 136 (0.32) n 59(8.36) k |
| 13 | k 134 (8.43) n 135(—)[b] i | i 133(0.13) n 101(6.87) k |
| 21 | k 124 (5.48) i | i 90.14(—)[b] 72(10.95) k |
| 22 | k 116 (8.81) i | i 89.21(—)[b] 82(8.15) k |

[a]k = crystalline, n = nematic, i = isotropic
[b]overlapped transitions.

TABLE 4

Phase transitions and phase transition enthalpies for polymers

| Polymer | Phase transitions, T °C. (Corresponding enthalpies changes, ΔH Kcal/mru)[a] | |
|---|---|---|
|   | heating | cooling |
| 14 | g-108-k 88(1.44) n 180(0.64) i | i 172(0.38) n |
| 15 | g-107 k 129(2.00) n 186(0.43) i | i 185(0.55) n 113(1.64) k |
| 25 | g-111 k$_1$ 1103(—)[b] k$_2$ 109(—)[b] k$_3$ 114(4.61)[b] i | i 113(0.31 n 93(—)[b] k$_2$ 83(4.32) k$_1$ |
| 26 | g-112 k$_1$ 84(—)[b] k$_2$ 93(—)[b] k$_3$ 102(3.57) n 132(0.23) i | i 127(0.20) n 85(—)[b] k$_3$ 76(—)[b] k$_2$ 62(3.58) k$_1$ |

[a]mru = mole of repeating unit
g = glassy, k = crystalline, n = nematic, i = isotropic
[b]overlapped transitions.

EXAMPLE 3

The present examples illustrates two side-chain liquid-crystalline copolysiloxanes containing mesogenic units based on 1,3-dioxane-2,5-diyl group and benzo[15]-crown-5. Scheme 3 presents the synthetic procedures used to prepare the 1,3-dioxane based monomers and the copolysiloxanes.

Diethyl 2-(4-pentenyl)malonate (16) and diethyl 2-(10-undecenyl)-malonate (17): Both compounds were synthesized by the same method. The preparation of 17 is presented as follows: Cleanly cut Na (3.45 g, 0.15 mol) was added in portions to absolute ethanol (150 mL). After the sodium was completely dissolved, diethyl malonate (24 g, 0.15 mol) was added to the reaction mixture and the solution was stirred for 1 h. 1-Chloro-10-undecene (28.3 g; 0.15 mol) was then added into the reaction mixture. After stirring at room temperature for 16 h, the ethanol was evaporated on rotavapor. The residue was dissolved in diethyl ether, washed several times with water, dried over anhydrous sodium sulfate, and diethyl ether was removed on a rotavapor.

The product was distilled at 155°-158° C./13-16 mmHg. Yield: 39 g (83%).

¹H NMR (CDCl₃): δ=1.13 to 2.08 (m; 24H, —(CH-)₉— and CH₃—CH₂—O—), 3.30 (t;

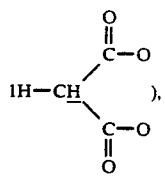

4.20 (m; 4H, —CH₂O), 4.94 (m; 2H, CH₂=), 5.8 (m;1H=CH—).

2-(4-Pentenyl)-1,3-propanediol (18) and 2-(10-undecenyl)-1,3-propanediol (19): Both compounds were synthesized by the same method. An example is presented as follows: A solution of diethyl 2-(10-undecenyl)malonate (39 g, 0.125 mol) in 50 mL of dried diethyl ether was added dropwise to a suspension of LiAlH₄ (4.75 g, 0.125 mol) in 250 mL of dried diethyl ether. After the addition was complete, the reaction mixture was stirred at 40° C. for 20 h, cooled to room temperature, and excess LiAlH₄ was reacted with ethyl acetate. The resulting solution was treated with dilute hydrochloric acid and extracted with diethyl ether. The organic phase was washed with 2 wt % aqueous solution of NaHCO₃, water, and dried over anhydrous sodium sulfate. The crude product, obtained after the solvent was evaporated, was recrystallized from diethyl ether at 0° C., m.p. 58°-59° C. Yield: 27 g (94%).

¹H NMR (CDCl₃): δ=1.06-2.16 (m; 18H, —(CH₂-)₉—), 3.30-3.81 (m; 5H,

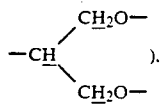

4.94 (m; 2H, CH₂=), 5.80 (m; 1H, =CH—).

4-Formylphenyl 2-(octahydrobenzo[b]-1,4,7,10,13-pentaoxacyclopentadecene) carboxylate (20): To a solution of 4'-carboxybenzo[15]crown-5 (2) (2 g, 6.4 mmol) in 100 mL of methylene dichloride was added dropwise thionyl chloride (1.14 g, 9.6 mmol). The resulting mixture was refluxed for 3 h followed by removal of solvent and excess of thionyl chloride under vacuum. The obtained acid chloride was immediately dissolved in 100 mL of tetrahydrofuran. The solution was then added dropwise to a mixture of 4-hydroxybenzaldehyde (0.78 g, 6.4 mmol) and triethylamine (0.64 g, 6.4 mmol) in 20 mL of tetrahydrofuran at 0°-5° C. The reaction mixture was stirred at room temperature overnight and filtered. The filtrate was evaporated in a rotavapor and the obtained solid was recrystallized from methanol, to give a white solid product; m.p. 180° C. Yield: 1.38 g(52%).

¹H NMR (CDCl₃): δ=3.70-4.25 (m; 16H, —(OCH₂CH₂)₄—), 6.78-7.78 (m; 7 aromatic protons), 9.8 (s; 1H, —CHO).

Syntheses of monomers 21 and 22: Both two compounds were synthesized by the same method. An example is presented below. 2-(10-Undecenyl)-1,3-propanediol (5 g, 0.0218 mol), 4'-formylphenyl 2-(octahydrobenzo[b]-1,4,7,10,13-pentaoxacyclopentadecene)carboxylate (9.1 g, 0.022 mol) and p-toluenesulfonic acid (200 mg) were dissolved in 200 mL of dried benzene. The reaction mixture was refluxed until 0.4 mL of water were collected on a Dean-Stark trap. After cooling to room temperature, the solution was washed with 2 wt % aqueous solution of NaHCO₃, water, dried over anhydrous Na₂SO₄, and the solvent evaporated on a rotavapor. The obtained solid was recrystallized for several times from methanol to form a white crystal of the trans-isomer; m.p. 116° C. Yield:8.19 g(60%).

| 21: C₃₀H₃₈O₉ (542.6) | Calc. | C 66.41 | H 7.06 |
|---|---|---|---|
| | Found | C 66.34 | H 7.06 |
| 22: C₃₆H₅₀O₉ (626.8) | Calc. | C 68.99 | H 8.04 |
| | Found | C 69.02 | H 7.98 |

¹H NMR chemical shifts of the obtained monomers 21, 22 are summarized in Table 2.

The thermal transitions and thermodynamic parameters of the synthesized monomers 21, 22 are listed in the Table 3. Monomers 21 and 22 present respectively a monotropic, nematic mesophase. In comparison with the enantiotropic, nematic mesophase shown by the monomers 12 and 13, it can be seen that when a phenyl ring in the mesogenic unit of a liquid crystal is replaced by a trans-1,3-dioxane ring, the thermal stability of the mesophase exhibited by the liquid crystal decreases.

Synthesis of copolymers 25 and 26

Copolymers were prepared by hydrosilylation of the corresponding olefinic derivatives with poly[(30–35%) methylsiloxane-co-(65–70%) dimethylsiloxane] using dicyclopentadienyl-platinum (II) chloride as catalyst in toluene. A detailed procedure is given as follows. The olefinic derivative (0.5 g; 10 mol % excess versus the Si-H groups) was dissolved in 50 mol of freshly-distilled toluene together with the proper amount of poly[(-30–35%) methylsiloxane-co-(65–70%) dimethylsiloxane]. The reaction mixture was heated to 110° C. under nitrogen, and 5 μl of dicyclopentadienylplatinum (II) chloride catalyst were then injected with a syringe as solution in methylene chloride (1 mg/ml). The reaction mixture was refluxed under nitrogen until both IR and ¹H-NMR analyses showed that the hydrosilylation reaction was complete. The solution was filtered and the polymers were separated by precipitation in methanol, purified by several reprecipitation from tetrahydrofuran solution into methanol, and dried under vacuum.

The thermal transitions and thermodynamic parameters of the synthesized copolysiloxanes are summarized in Table 4. Comparing the chemical structure and the thermal behaviour of polymer 26 with those of polymer 15, we observe that replacing a phenyl ring in the mesogenic unit of a liquid-crystalline polymer by a trans-1,3-dioxane ring moiety decreases the thermal stability of the mesophase exhibited by these polymers.

FIG. 4 illustrates some representative DSC traces for polymers 25 and 26. Polymer 25 displays three overlapped melting transitions on the heating scan. On the cooling scan it displays an isotropic to nematic phase transition at 113° C. followed by two crystallization transitions. The nematic phase presents a schlieren texture. Polymer 26, in the heating scans, displays three melting transitions followed by a nematic mesophase which undergoes isotropization at 132° C.; in the cooling scans it displays an isotropic to nematic transition at 127° C. followed by three crystallization transitions. In some previous studies, it has been demonstrated that side-chain liquid crystalline polymers containing eleven methylene units in the spacer and trans-2,5-disubstituted-1,3-dioxane based mesogens do not undergo side-chain crystallization. The conformational isomers of the 1,3-dioxane based mesogens are in a dynamic equilibrium and this depresses their crystallization when they are attached as side-chains. However, both polymers 25 and 26 present multiple melting transitions. The reason could be due to the bulky crown ether groups which impede the interchange of the conformational isomers of the 1,3-dioxane based mesogens, and hence the side chains have the chance to crystallize. FIG. 5 presents the typical nematic schlieren texture exhibited by polymer 26.

EXAMPLE 4

The present example illustrates the use of the polymer 26 as an ion-selective polymer membrane.

A membrane was formed by cast molding which comprises pouring a solution of polymer 26 in THF on a Teflon ® plate and removing THF by evaporation. This membrane was hooked up to an potassium ion-selective electrode sold by Ingold Co., in which the original ion-selective membrane was replaced by the membrane formed in this example, i.e. a membrane formed by side-chain liquid crystalline copolymer containing crown ether based mesogens. The complete diagram of the cell can be presented as follows Ag·AgCl|0.001M KCl|membrane|testing
solution·KCl (sat.) Ag·AgCl The electric potential meter used is Suntex Model SP-7.

The electrode was tested with standard K+ solutions, and the results were plotted in FIG. 6. A linear relationship between electrode response (mV) and K+ concentration was obtained from FIG. 6. The electrode was also tested with solutions containing both K+ and Na+ ions, and the results were plotted in FIG. 7. It can be seen from FIG. 7 that the linear relationship between electrode response (mV) and K+ concentration was not affected by the Na+ ions. The results of FIGS. 6 and 7 mean that the synthesized side-chain liquid crystalline copolymer 26 containing crown ether based mesogens is suitable to be used for the application of K+ ion-selective electrode.

What is claimed is:

1. A side-chain liquid crystalline polymer containing crown ether based mesogens having the following structure

wherein:
the polymer backbone, having a number average molecular weight of 400–15,000, is siloxane copolymer;
the spacer is —$(CH_2)_m$—, wherein m is an integer from 1–12, or —$(OCH_2CH_2)_i$—, wherein i is an integer from 1–4; and
the crown ether based mesogen which is connected to the polymer backbone with the spacer is

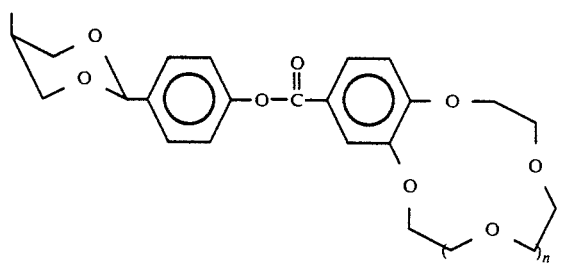

wherein n is an integer of 0–3.
2. The polymer of claim 1, wherein n is 2.
3. The polymer of claim 1, wherein m is an integer from 3–9.

* * * * *